(12) United States Patent
Bunel

(10) Patent No.: US 8,752,842 B2
(45) Date of Patent: Jun. 17, 2014

(54) DOUBLE SEAL

(75) Inventor: Serge Bunel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 149 days.

(21) Appl. No.: 12/673,826

(22) PCT Filed: Aug. 8, 2008

(86) PCT No.: PCT/FR2008/001182
§ 371 (c)(1),
(2), (4) Date: Feb. 17, 2010

(87) PCT Pub. No.: WO2009/056700
PCT Pub. Date: May 7, 2009

(65) Prior Publication Data
US 2011/0018213 A1    Jan. 27, 2011

(30) Foreign Application Priority Data
Aug. 20, 2007  (FR) ...................... 07 05932

(51) Int. Cl.
*F16J 15/02*   (2006.01)

(52) U.S. Cl.
USPC ........................... 277/644; 49/490.1

(58) Field of Classification Search
USPC ......... 277/605, 608, 609, 644, 645, 646, 921; 49/479.1, 498.1, 493.1
See application file for complete search history.

(56) References Cited

U.S. PATENT DOCUMENTS

| | | | | |
|---|---|---|---|---|
| 3,020,185 A * | 2/1962 | Moffitt et al. | ................ | 428/365 |
| 3,023,860 A * | 3/1962 | Ellzey | ................ | 244/120 |
| 3,026,367 A * | 3/1962 | Hartwell | ................ | 174/357 |
| 3,206,229 A * | 9/1965 | Kramer | ................ | 285/114 |
| 3,381,988 A * | 5/1968 | Dewar | ................ | 52/716.3 |
| 3,583,730 A * | 6/1971 | Kozlowski | ................ | 285/47 |
| 3,858,752 A * | 1/1975 | Marvin et al. | ................ | 220/325 |
| 4,115,609 A * | 9/1978 | Denman | ................ | 428/68 |
| 4,246,304 A * | 1/1981 | Dixon | ................ | 428/34.1 |
| 4,352,520 A * | 10/1982 | Stiglmaier et al. | ................ | 296/204 |
| 4,441,726 A * | 4/1984 | Uhl | ................ | 277/652 |
| 5,193,823 A * | 3/1993 | Janich | ................ | 277/345 |
| 5,251,917 A | 10/1993 | Chee et al. | | |
| 5,609,313 A * | 3/1997 | Cole et al. | ................ | 244/54 |
| 5,611,550 A * | 3/1997 | Belser | ................ | 277/642 |
| 6,075,205 A * | 6/2000 | Zhang | ................ | 174/358 |
| 6,116,615 A * | 9/2000 | Trehan | ................ | 277/630 |
| 6,719,302 B2 * | 4/2004 | Andrick | ................ | 277/604 |
| 7,090,226 B1 * | 8/2006 | Trainor et al. | ................ | 277/630 |

FOREIGN PATENT DOCUMENTS

DE    10325237    12/2004
GB    2340111    2/2000

OTHER PUBLICATIONS

International Search Report; PCT/FR2008/001182; Apr. 9, 2009.

* cited by examiner

*Primary Examiner* — Vishal Patel
(74) *Attorney, Agent, or Firm* — Brinks Gilson & Lione

(57) ABSTRACT

The invention relates to a seal (1) designed to be inserted between a nacelle element and an element of a turbojet of an aircraft propulsion unit. According to the invention, the seal (1) consists of at least two parallel tubular parts (2) each having a quadrangular cross-section including a planar supporting face (4), a convex contact face (6) in contact with an element to be sealed and two concave side faces (5) connecting the convex contact face (6) and the planar supporting face (4), said two tubular parts (2) being formed by a knitted web coated with a synthetic matrix.

5 Claims, 4 Drawing Sheets

DOUBLE SEAL

TECHNICAL FIELD

The invention relates to a seal designed to isolate a region liable to experience a fire in an aircraft propulsion unit.

BACKGROUND

An aircraft can be propelled by a number of turbojets each housed in a nacelle also accommodating a collection of auxiliary equipment associated with its operation and performing various functions when the turbojet is operating or stationary.

A nacelle such as that shown by way of example in FIG. 2 generally has a tubular structure comprising
(i) an air inlet 20 in front of a turbojet 30,
(ii) a mid-section 40 intended to surround a fan of the turbojet,
(iii) a rear section 50 which may optionally incorporate thrust reversal means and which is intended to surround the combustion chamber of the turbojet 30, and
(iv) an exhaust nozzle 60 whose outlet is situated downstream of the turbojet.

Modern nacelles are often intended to accommodate a bypass turbojet which is designed, via the rotating fan blades, to generate a hot air flow (also known as primary flow) from the combustion chamber of the turbojet.

Each propulsion unit of the aircraft is thus formed by a nacelle and a turbojet, and is suspended from a fixed structure of the aircraft, for example below a wing or on the fuselage, by means of a pylon or strut attached to the turbojet or to the nacelle.

The rear section of the outer structure of the nacelle is usually formed by two cowls 51 of substantially hemicylindrical shape, on either side of a longitudinal vertical plane of symmetry of the nacelle, said cowls being movably mounted so as to be able to deploy between a working position and a maintenance position in order to give access to the turbojet.

The two cowls 51 are generally mounted pivotably about a longitudinal axis forming a hinge in the upper part (at 12 o'clock) of the reverser. The cowls 51 are maintained in a closed position by means of locks arranged along a junction line situated in the lower part (at 6 o'clock).

A 6 o'clock, the turbojet has an offset piece of equipment; this is an accessory gearbox which particularly comprises a starter, a fuel pump and a hydraulic pump. A power shaft connects the starter to the turbojet, and various lines, particularly fuel and pressurized fluid lines, are arranged radially in order to supply the turbojet from the accessory gearbox.

On account of the presence of fuel, the region of the nacelle that provides the connection between the accessory gearbox and the turbojet must be confined so that any fire possibly arising through a leak of fuel does not propagate to the rest of the propulsion unit.

Fire-resistant seals are usually composed of a silicone matrix, which imparts elasticity to the seal, reinforced with glass or carbon fabric which provides fire resistance. The fire resistance is mainly obtained by the glass or carbon fabric, the weave of which is dense and tight. On the other hand, this type of seal is extremely stiff and is incapable of hugging an irregular bearing surface. In particular, this type of seal is inappropriate for curvilinear regions having a small radius. Now, a nacelle is a complex component which has particularly irregular internal contours.

In addition to constituting a fire barrier, a seal must produce a sealing barrier between the nacelle and the turbojet, that is to say that it must permanently maintain contact between these two elements. Now, in an aircraft propulsion unit, the nacelle may have large dimensions and, therefore, the relative movements which are produced between the nacelle and the turbojet during its operation may be of large amplitude.

BRIEF SUMMARY

The disclosure improves the sealing and the fire resistance of a seal interposed between an element of a nacelle and an element of a turbojet.

A seal is provided which is designed to be interposed between a nacelle element and an element of a turbojet of a propulsion unit of an aircraft; this seal comprises at least two parallel tubular portions each having a quadrangular cross section including a planar bearing face, a convex contact face for contact with an element to be sealed, and two concave side faces connecting the convex contact face to the planar bearing face, the two tubular portions being formed by a knitted fabric coated with an elastic synthetic matrix.

Thus, the seal has a noteworthy fire resistance combined with a reduced overall size and with a large compression capacity.

In terms of fire resistance, the seal creates a double barrier. In the event of fire, the seal maintains its confinement capacity by dissipation of some of the energy of the flames through one of the tubular portions, which may be partly or completely consumed, while the second tubular portion remains intact.

In terms of flexibility, the seal 1 according to the invention can hug a curvilinear path having angles of small radius through its knitted fabric which has high degrees of elongation, in all directions.

In terms of overall size in the compression phase, the seal according to the invention has an extremely favorable behavior since the concave side faces bend toward the inside of each tubular portion. The concavity of the side faces makes it possible, on the one hand, to place the seal in a location of reduced dimensions and, on the other hand, to juxtapose two tubular portions which can therefore each be compressed without lateral interference.

According to a preferred arrangement of the invention, the two tubular portions are joined at their bearing face by a sole. Thus, the seal constitutes a unit assembly which can be fitted for example by adhesive bonding or by a mechanical fastening of the riveting type while unrolling it over a nacelle portion.

It is envisioned that the knitted fabric comprises yarns of a material from the group comprising glass, carbon and ceramic.

In one embodiment, each tubular portion has a substantially square cross section.

BRIEF DESCRIPTION OF THE DRAWINGS

For a good understanding thereof, the invention is described with reference to the appended drawing representing by way of nonlimiting example an embodiment of a seal according to the invention.

DETAILED DESCRIPTION

Figure 1:
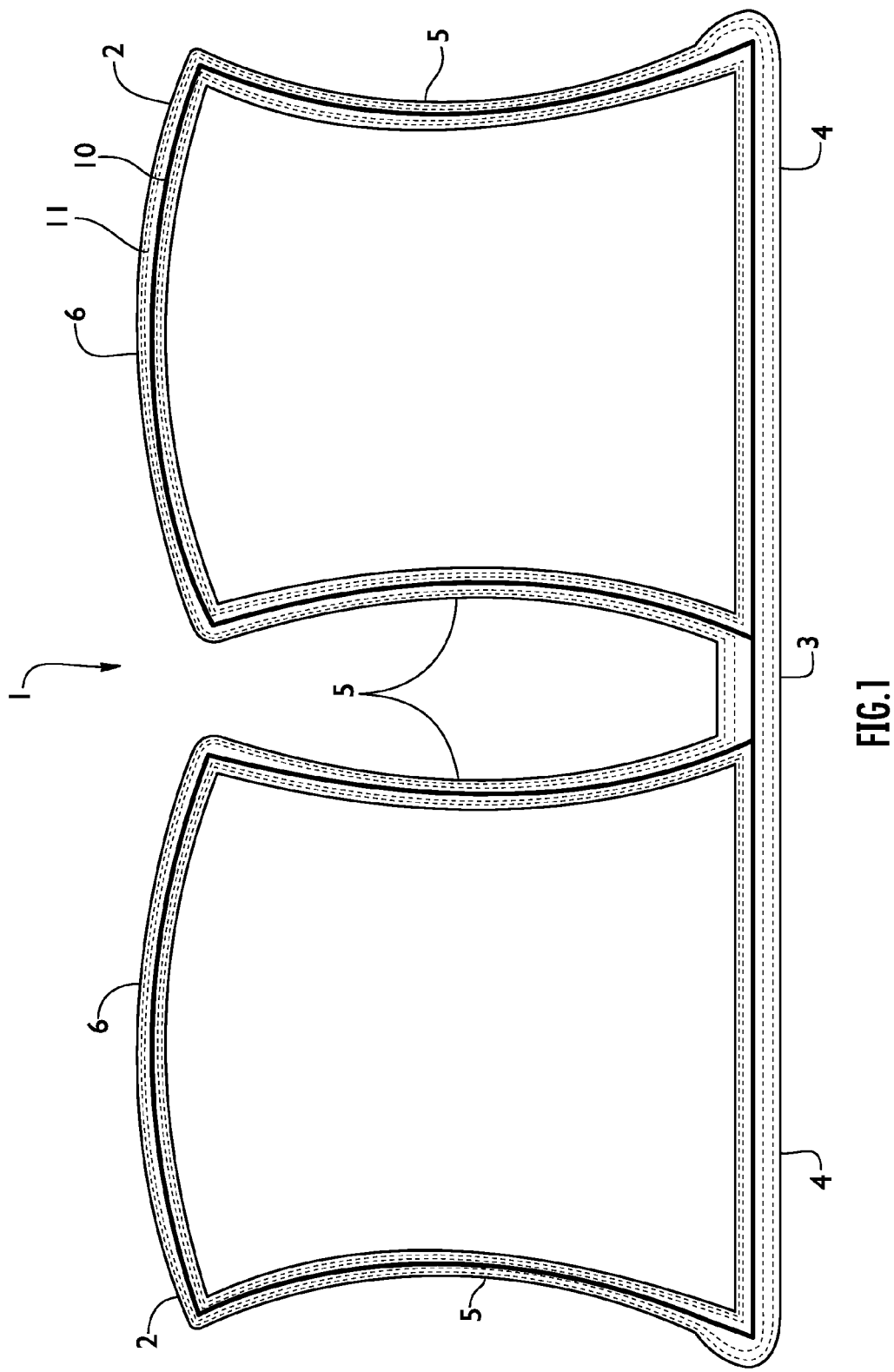
FIG. 1 is a view in cross section of an embodiment of a seal according to the invention fitted on a cowl of a rear section of a nacelle.
Figure 2:
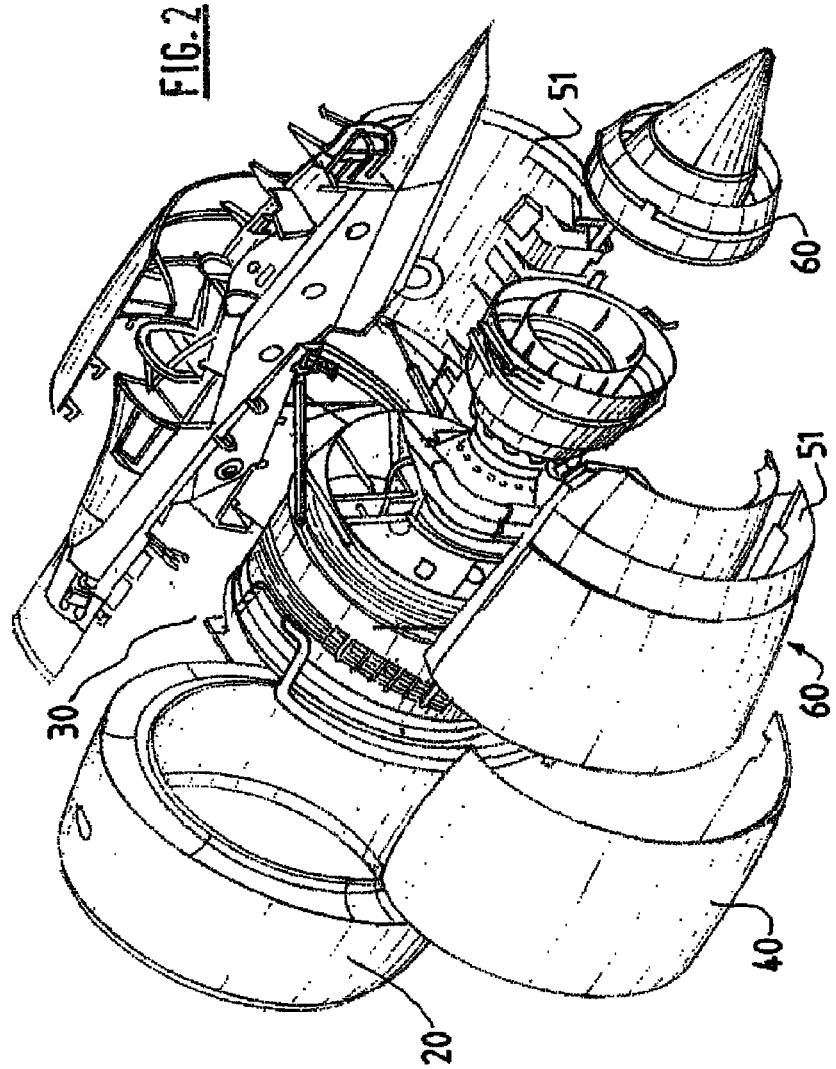
FIG. 2 is an exploded perspective view of an aircraft propulsion unit comprising a nacelle and a turbojet.

As shown in FIG. 1, the seal 1 comprises two tubular portions 2 connected by a common sole 3. In the example represented, the two tubular portions 2 are identical and each have a quadrangular cross section. Each tubular portion 2 thus has a bearing face which merges in part with the bearing sole 3; extending substantially perpendicularly from the bearing face 4 are two concave side faces 5 which support a convex contact face 6.

The seal 1 according to the invention comprises a knitted fabric 10, that is to say a structure formed by an intertwining of loops formed by one or more yarns; the knitted fabric 10 has high degrees of elongation in all directions. The yarns which are used in the composition of the knitted fabric 10 are yarns which have a large fire resistance and can be, for example, ceramic, carbon or glass yarns. The knitted fabric 10 is given a coating of a synthetic matrix material 11 such as, for example, silicone, which likewise has a high degree of elongation.

Purely by way of indication, the thickness of the concave side faces 5 and of the convex contact face 6 may be, for example, of the order of 1 to 2 mm, while the thickness of the bearing face 4 may be, for example, of the order of 2 to 4 mm.

Figure 3:
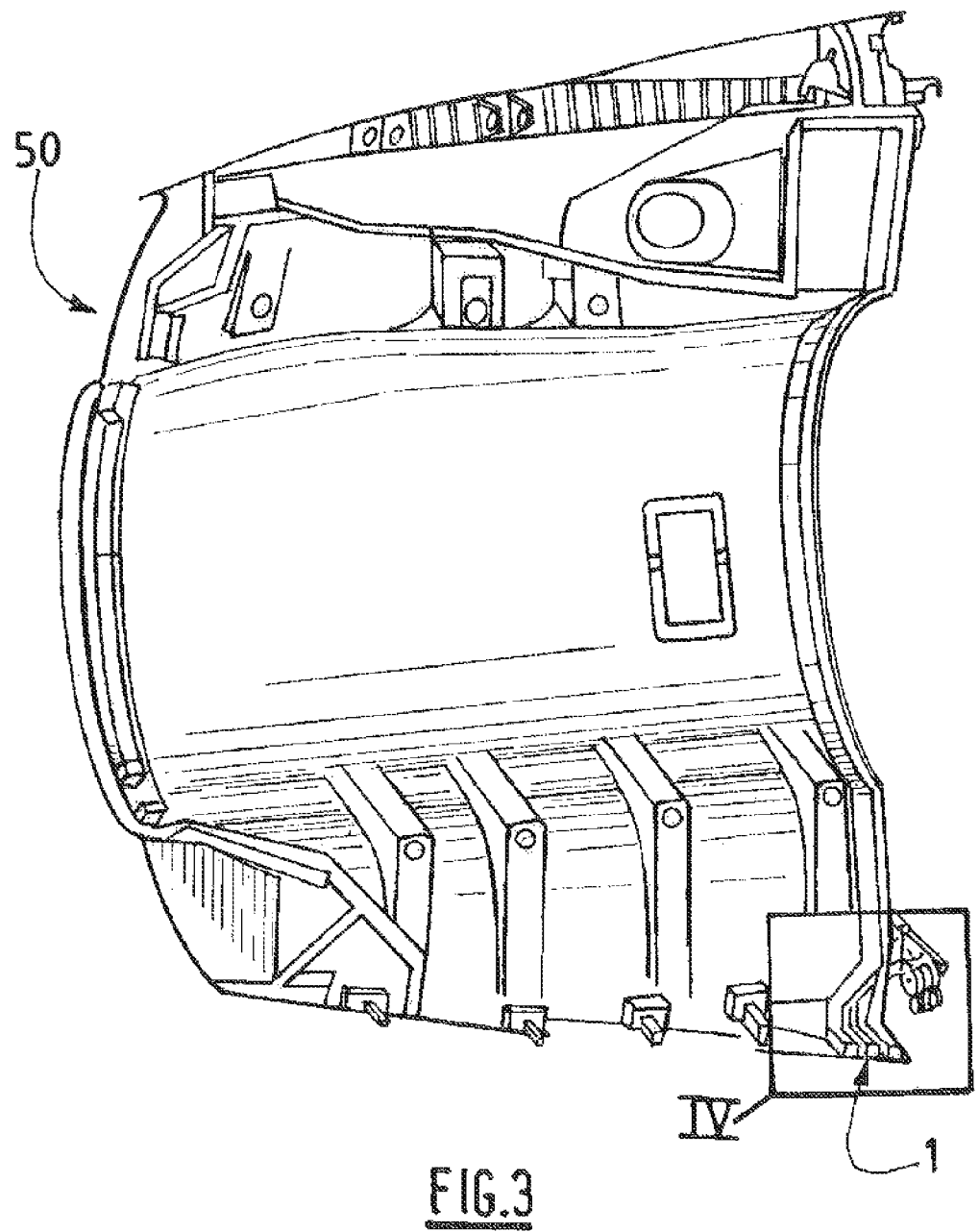
FIG. 3 is a partial perspective view of a rear half-section of a nacelle, showing the location of the seal according to the invention.
Figure 4:
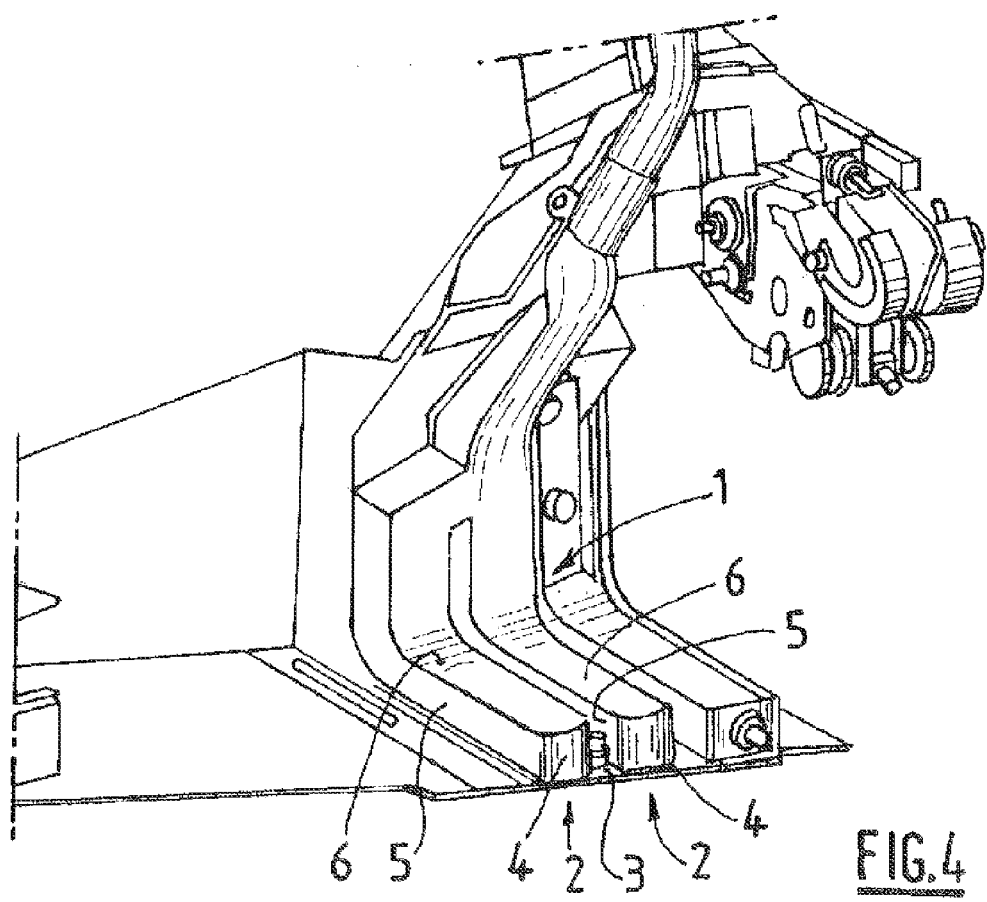
FIG. 4 is an enlarged view of the detail IV in FIG. 3.

The seal 1 as is shown in FIG. 1 is positioned on a propulsion unit nacelle so as to border and confine a region liable to experience an accidental fire; this may be, for example, the region of the nacelle that is situated at 6 o'clock and is traversed by the power shaft and various lines which connect the accessory gearbox to the turbojet, as illustrated in FIGS. 3 and 4.

In terms of fire resistance, the seal 1 according to the invention creates a double barrier. Each tubular portion 2 on its own does not constitute a sufficient fire barrier. The fire resistance is obtained by the combination of the two tubular portions 2 which form a fire seal by dissipation of some of the energy of the flames through one of the tubular portions 2, which may be partly or completely consumed, while the second tubular portion 2 remains intact and maintains its confinement power. The fact that two tubular portions 2 are used in parallel also has a favorable corollary in terms of overall size. Specifically, given an equal fire resistance, a seal according to the prior art with a single tubular portion will have to have a cross section much larger than the sum of the cross sections of the two tubular portions 2 of the seal 1 according to the invention.

In terms of flexibility, the seal 1 according to the invention can hug a curvilinear path which has angles of low radius; this capability is imparted to the seal 1 according to the invention by its knitted fabric which has high degrees of elongation, in all directions.

In terms of overall size in the compression phase, the seal 1 according to the invention has an extremely favorable behavior. Specifically, when the element of the propulsion unit which bears on the contact face moves with respect to the element on which the seal is fastened, the seal is compressed to a constant width. Specifically, the concave side faces bend toward the inside of each tubular portion. The concavity of the side faces makes it possible, on the one hand, to place the seal in a location of reduced size and, on the other hand, to juxtapose two tubular portions which can therefore each be compressed without lateral interference.

Although the invention has been described in connection with specific exemplary embodiments, it is quite clear that it is in no way limited thereto and that it comprises all the technical equivalents of the means described and also their combinations if they come within the scope of the invention. Thus, the tubular portions could have a rectangular cross section. It can also be envisioned to produce a seal of which the tubular portions are asymmetric so as to take account of the particular contours of the surfaces to be sealed.

The invention claimed is:

1. A sealing member to be interposed between a nacelle element and an element of a turbojet of a propulsion unit of an aircraft, the sealing member comprising:
   at least two parallel independent tubular elements each having a quadrangular cross section including a planar bearing face at one end, a convex contact face for contact with an element to be sealed at another end, and two concave side faces connecting the convex contact face to the planar bearing face, the two tubular elements being connected by a common sole and formed by a knitted fabric coated with a synthetic matrix, wherein the planar bearing face merges in part with the sole,
   wherein the sealing member is configured to be compressed to a constant width by the concave side faces of the at least two parallel tubular portions, the concave side faces bending toward an inside of the tubular portion when the convex contact face contacts and is compressed by the element to be sealed.

2. The sealing member as claimed in claim 1, wherein the knitted fabric is composed of a material comprising at least one of glass, carbon and ceramic.

3. The seal sealing member as claimed in claim 1, wherein each tubular element has a substantially square cross section.

4. The seal sealing member as claimed in claim 2, wherein each tubular element has a substantially square cross section.

5. The seal sealing member as claimed in claim 1, wherein the at least two parallel tubular elements are configured to be mounted between the nacelle element and the element of the turbojet such that, when a fire is ignited, one of the at least two parallel tubular elements acts as a first fire barrier to consume part of energy of the fire, and the other one of the at least two parallel tubular elements acts as a second fire barrier to resist the fire after the fire consumes the first fire barrier.

* * * * *